Feb. 1, 1949.  E. B. PEATROSS  2,460,394
FENDER PROTECTOR
Filed Jan. 13, 1947
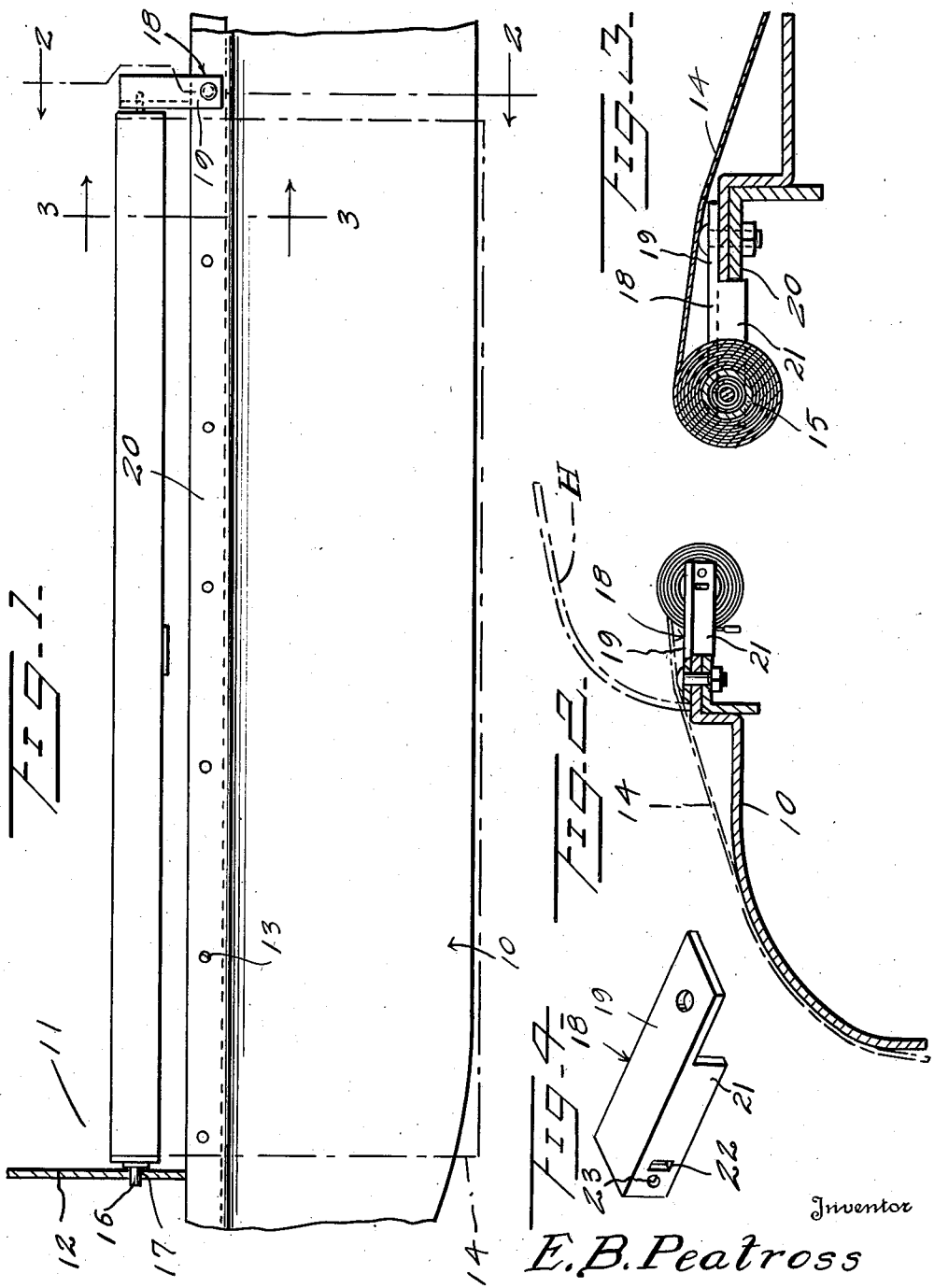
Inventor
E. B. Peatross
By Kimmel & Crowell
Attorneys Patented Feb. 1, 1949

2,460,394

UNITED STATES PATENT OFFICE 2,460,394

FENDER PROTECTOR

Erin B. Peatross, Washington, D. C.

Application January 13, 1947, Serial No. 721,835

1 Claim. (Cl. 280—150)

This invention relates to a flexible protecting means for engagement over the fender or front portion of a vehicle for protecting the finish.

Where attendants service a motor vehicle or make repairs within the engine compartment, the enamel or other finish on the fender or adjacent portion of the vehicle is frequently scratched, soiled, or otherwise damaged. Most establishments use a fabric sheet which is thrown over the fender so as to protect the finish when major repairs or service operations are involved, but most attendants do not use such sheets while making minor check-ups, inspections, and service operations, with the result that such finish is totally unprotected during such frequent operations and in many instances the finish is seriously damaged. It is, therefore, an object of this invention to provide a protecting cover for fenders or the like, which is permanently mounted within the engine compartment and is extendible from the engine compartment outwardly over the fender. This protector is preferably wound on a spring roller so that it will occupy only a small space when not in use, and will be protected against damage, and will not interfere with inspection of the engine or other parts in the engine compartment.

It is also an object of this invention to protect the clothing of the operator of the vehicle from dirt, dust, water and other matter injurious to clothing if it becomes necessary for the operator to perform any emergency servicing or adjusting of the vehicle within the engine compartment.

With the above and other objects in view, my invention consists in the arrangement, combination and details of construction disclosed in the drawings and specification, and then more particularly pointed out in the appended claim.

In the drawings,

Figure 1 is a detail plan view of a fender protector constructed according to an embodiment of this invention, mounted in the engine compartment of a vehicle, the fender of the vehicle being broken away and a portion of the compartment being shown in section, Figure 2 is a fragmentary sectional view taken on the line 2—2 of Figure 1, Figure 3 is a fragmentary sectional view taken on the line 3—3 of Figure 1, Figure 4 is a perspective view of the roller supporting bracket.

Referring to the drawing, the numeral 10 designates generally the fender of a vehicle, preferably the front fender, and the numeral 11 designates generally the engine compartment, having a rear wall 12. The fender 10 is secured to the outer edge of the engine compartment 11 as indicated, by the fastening means 13.

In order to provide a means whereby the finish of the fender 10 may be protected when an attendant or workman is engaged with repair or other work being performed, either on the engine or within the engine compartment, I have provided an elongated flexible sheet 14. The sheet 14 may be made of any suitable flexible material such as fabric or the like and may have a suitable coating which will be oil resistant.

The sheet 14 is wound on a spring roller 15 which at its rear end has the stud 16 thereof extending through an opening 17 formed in the rear wall 12 of the compartment. The roller 15 is adapted to be disposed substantially parallel with the inner edge of the fender 10, and the forward or opposite end of the roller 15 is supported by means of a bracket 18. The bracket 18 includes a base plate 19 which may be secured to the flange 20 formed at the inner edge of the fender 10 by one of the fastening members 13. The bracket 18 can be varied as to its configuration in accordance with the particular style of the vehicle with which this device is associated and can be made in right and left pairs for use at each end of the roller where installation at the rear end in an opening in the rear wall 12 of the compartment is not feasible, so that the roller 15 will be maintained in substantially parallel relation with the inner edge of the flange 20 of the fender 10.

The bracket 18 has a depending flange 21 extending from the base plate 19 thereof, and this flange 21 is formed with a rectangular opening 22 for receiving one end of the roller, and is also formed with a round opening 23 adjacent the opening 22 so that the bracket can be used for either end of the roller.

During the normal operation of the vehicle the protecting cover 14 will be completely wound on the roller 15 and this roller will be disposed beneath the hood H of the vehicle. However, when work is being performed, either on the engine or any of the parts within the engine compartment 11, the protecting sheet 14 may be pulled outwardly so that it will overlie and drape over the fender 10, as shown in dot and dash lines in Figures 1 and 2. In this manner the finish of the fender can be protected at all times when any work is being performed on the engine or on parts within the engine compartment, and it will not be necessary for the attendant to use a separate protecting cover as is done in certain instances where such covers are available for use of the attendant.

I do not mean to confine myself to the exact details of construction herein disclosed, but claim all variations falling within the purview of the appended claim.

What I claim is:

In combination, motor vehicle having an engine compartment, a fender extending outwardly from said engine compartment, a spring roller, roller supporting brackets fixed on said fender and extending inwardly of said engine compartment, an engine compartment hood for enclosing said roller and said roller supporting brackets, and a flexible fender covering member engaging about said roller whereby said fender covering member may be pulled outwardly for covering the fender in the raised position of said hood.

ERIN B. PEATROSS.

REFERENCES CITED

The following references are of record in the file of this patent:

UNITED STATES PATENTS

| Number | Name | Date |
|---|---|---|
| 1,593,885 | Solecki | July 27, 1926 |
| 2,119,072 | Cohen | May 31, 1938 |